(12) United States Patent
Yabe et al.

(10) Patent No.: US 6,213,646 B1
(45) Date of Patent: Apr. 10, 2001

(54) LINEAR GUIDE APPARATUS

(75) Inventors: Shiroji Yabe; Nobumitsu Takahashi, both of Toriba-machi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/296,112

(22) Filed: Apr. 21, 1999

(30) Foreign Application Priority Data

Apr. 28, 1998 (JP) .................................................. 10-118285

(51) Int. Cl.⁷ ...................................................... F16C 29/06

(52) U.S. Cl. .............................................. 384/15; 384/45

(58) Field of Search ................................. 384/15, 43, 44, 384/45; 464/168

(56) References Cited

U.S. PATENT DOCUMENTS

| | | | |
|---|---|---|---|
| 5,494,354 | 2/1996 | Tsukada | 384/13 |
| 5,694,811 | 12/1997 | Tsukada | 74/467 |
| 5,769,543 | 6/1998 | Tsukada et al. | 384/15 |

*Primary Examiner*—Lenard A. Footland
(74) *Attorney, Agent, or Firm*—Marshall, O'Toole, Gerstein, Murray & Borun

(57) ABSTRACT

End caps are respectively joined to opposite ends of a slider main body of a linear guide apparatus. Each end cap has curved passage for bringing the load rolling-element rolling groove of the slider main body into communication with the rolling-element return passage to thereby construct a rolling-element circulating passage for circulating a plurality of rolling elements. At least a portion of the end caps in contact with at least one of the rolling elements and guide rail is made of an oil containing material.

6 Claims, 4 Drawing Sheets

LINEAR GUIDE APPARATUS

BACKGROUND OF THE INVENTION

1. Field of the Invention

The present invention relates to a linear guide apparatus, and more particularly to a self-lubricating linear guide apparatus which can automatically supply a lubricant to a rolling element for a long time.

2. Description of the Related Art

Such a kind of related art is disclosed in JP-A-9-53637 (Laid-Open) which has been proposed by the applicant of this application. In the linear guide apparatus according to this related art, a lubricant containing member (member of oil-containing material), which is a lubricant-containing rubber or synthetic resin, is attached to the ends of a slider moving along a guide rail, specifically the ends of end caps mounted on both front and rear end surfaces of the slider, in an overlapping manner so as to be sandwiched between plate members. The lubricant contained in the lubricant containing member seeps gradually to be supplied automatically to the rolling elements through the guide rail so that smooth rolling of the rolling elements can be maintained.

The above linear guide apparatus according to the related art can maintain the smooth rolling of the rolling elements using the self-lubricating property of the lubricant containing member. However, the lubricant containing member is a separate body from the slider and is considerably thick because it is sandwiched between the plate members for reinforcement. The lubricant-containing member thus thickened is attached to both ends so that the entire length of the slider inclusive of the lubricant containing member is increased. Correspondingly, the stroke of the linear guide apparatus is shortened.

SUMMARY OF THE INVENTION

The present invention has been accomplished in order to solve such an unsolved problem of the related art. The present invention intends to provide a linear guide apparatus which has a self-lubricating property, and does not change the entire length of the slider and hence not shorten the stroke.

In order to attain the above object, according to the present invention, there is provided a linear guide apparatus including: a guide rail extending in an axial direction and having axial rolling-element rolling grooves formed in both side surfaces thereof; a slider main body loosely and movable fitted about the guide rail, the slider main body having load rolling-element rolling grooves respectively opposing the rolling-element rolling grooves of the guide rail and having through bores acting as rolling-element return passage formed in parallel to the rolling-element rolling grooves of the slider main body; end caps respectively joined to opposite ends of the slider main body, each of the end caps having curved passages for bringing the load rolling-element rolling grooves of the slider main body into communication with the rolling-element return passages to thereby construct a rolling-element circulating passage; and a plurality of rolling elements rollably filled in the rolling-element circulating passage, wherein at least a portion of the end caps in contact with at least one of the rolling elements and guide rail is made of an oil containing material.

DETAILED DESCRIPTION OF THE PREFERRED EMBODIMENTS

Figure 1:
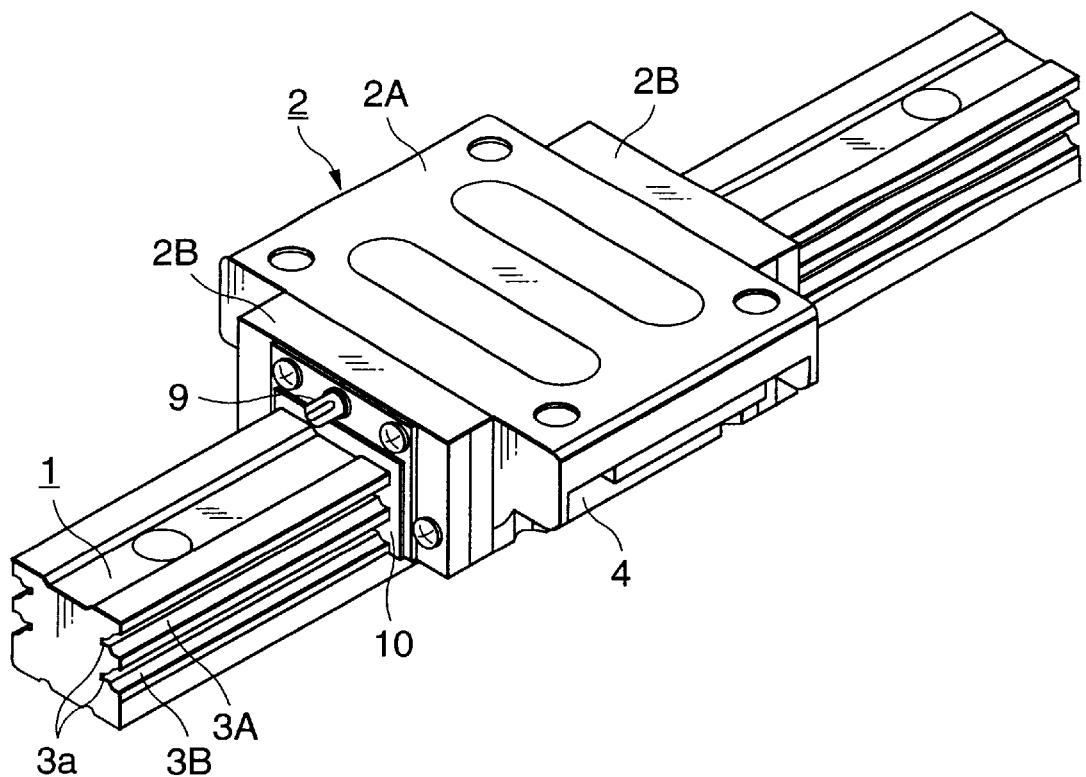
FIG. 1 is a perspective view of a linear guide apparatus according to a first embodiment of the present invention.

Now, referring to the drawings, an explanation will be given of embodiments of the present invention.

FIGS. 1 to 4 show a first embodiment of the present invention. First, the structure of the linear guide apparatus will be described below. The linear guide apparatus according to this embodiment, as shown in FIG. 1, is composed of a guide rail 1 which has rolling-element rolling grooves 3A and 3B on the outer surface and extends in an axial direction, and a slider 2 assembled to step over the guide rail 1. On each of the bottoms of the rolling-element rolling grooves 3A and 3B of the guide rail 1, there is formed a relief groove 3a of a holder (described later) for preventing the rolling-elements from falling out in a state where the slider 2 is not assembled to the guide rail 1.

Figure 3:
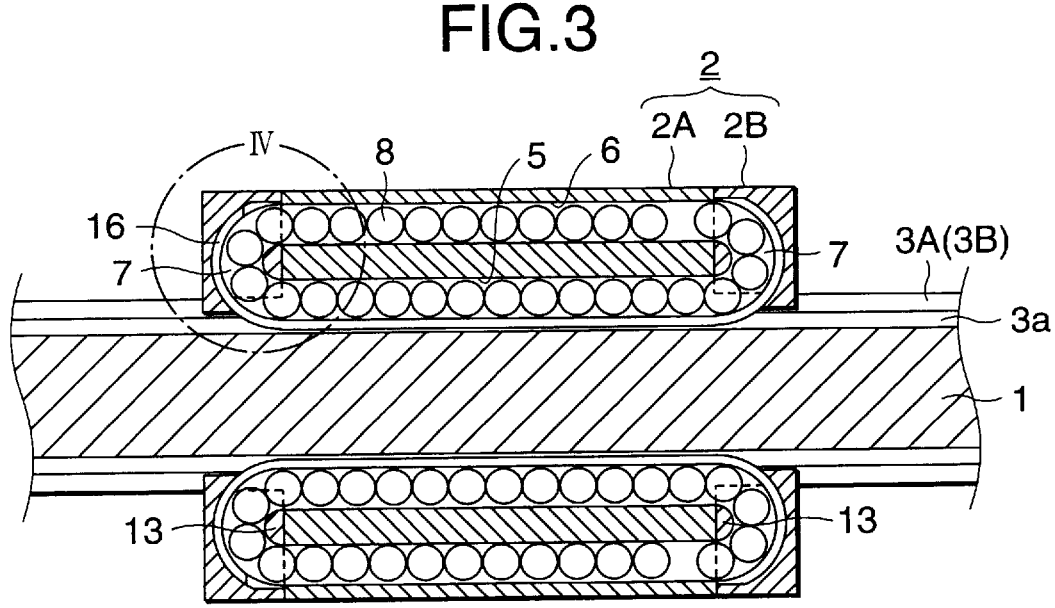
FIG. 3 is a sectional view of the slider and guide rail for explaining the internal structure of the linear guide apparatus shown in FIG. 1.

The slider 2 is composed of a slider body 2A and end caps 2B attached to both ends thereof. The slider body 2A has load rolling-element rolling grooves 5 opposite to the rolling-element rolling grooves 3A and 3B of the guide rail 1 as shown in FIG. 3, which are provided on the inner surfaces of both shoulders 4. The slider body 2A has also rolling-element returning passages 6 which pass through the thick portions of the shoulders 4 in an axial direction. The end cap 2B has curvature passages 7 each of which communicates the load rolling-element rolling groove 5 of the slider body 2A and the rolling-element returning passage 6 in parallel thereto. Thus, a rolling-element circulating passage is composed of the load rolling element rolling groove 5, rolling element returning passage 6 and curvature passages 7 on both ends. A large number of rolling elements of e.g. steel balls are loaded in the rolling element circulating passage. Incidentally, in FIG. 1, reference numeral 9 denotes a grease nipple attached to the end surface of the end cap 2B, and reference numeral 10 denotes a seal for preventing foreign matter from invading the slider 2.

The end cap 2B according to this embodiment is an injection-molded product of an oil containing material described below.

The oil containing material forming the end cap may be rubber containing a lubricant. In this case, for example, the polyurethane rubber hardened in a state containing grease may be used. The polyurethane rubber is a compound formed by the reaction of polyisocyanate with an active hydride. The polyisocyanate may be trilenediisocyanate, hexamethylenediisocyanate, etc. The active hydride may be hydrocarbon such as polybutadiene; polyether such as polyoxypropylene; long-chain active hydride such as caster oil, polyester and polycarbonate; polyhydroxy compound such as water and ethyleneglycol; or a short-chain hydride such as aminoalcohol, polyamino compound, etc. The grease may be ordinary grease such as mineral oil lithium soap grease.

The oil containing material used to form the end cap according to the present invention may be synthetic resin containing the lubricant. In this case, the oil containing material may be polymer, which is selected from the group of poly α-olefin polymer having basically the same chemical structure such as polyethylene, polypropylene, polybuthylene, polymethylpentene, mixed with the lubricant selected alone or in combination from the group consisting of paraffine hydrocarbon oil such as poly α-olefin oil, naphthene hydrocarbon oil, mineral oil, ether oil such as dialkyl diphenyl ether, ester oil such as phthalate ester and trimellitic acid ester, etc. The lubricant may contain several kinds of additives such as antioxidant, rust preventive, abrasion preventive, antifoaming agent, extreme pressure agent, etc. The material is injection-molded to form the end cap made of the oil containing material according to the present invention.

The composition ratio of the above oil containing material is poly α-olefin polymer of 20–80 weight % and lubricant of 80–20 weight %. If the composition of the poly α-olefin polymer is less than 20 weight %, the material cannot provide hardness, strength, etc. higher than a certain level. If the composition of the poly α-olefin polymer exceeds 80 weight % (i.e. the composition of the lubricant is less than 20 weight %), the supply amount of the lubricant is reduced, so that the self-lubricating effect is attenuated.

The polymers belonging to the above group have the same basic structure and different average molecular weights within a range of $1 \times 10^3 – 5 \times 10^6$. The polymer having a relatively low molecular weight of $1 \times 10^3 – 1 \times 10^5$ and the polymer having an ultra-high molecular weight of $1 \times 10^6 – 5 \times 10^6$ are used alone or in combination as occasion demands. In order to improve the mechanical strength of the end cap according to the present invention, the following thermoplastic resin and thermosetting resin may be added to the above poly α-olefin polymer.

The thermoplastic resin may be polyamide, polycarbonate, polybuthylene terephthalate, polyphenylene sulfide, polyether sulfone, polyether ketone, polyamideimide, polystyrene, ABS resin, etc. The thermosetting resin may be non-saturated polyester resin, urea resin, melamine resin, phenol resin, polyimide resin, epoxy resin, etc.

These resin materials may be used alone or in combination. Further, in order that the polyolefin polymer and the other resin maybe dispersed in a more uniform state, a suitable compatibility agent may be added. Moreover, in order to improve the mechanical strength, a filler may be added. For example, the filler may be an inorganic whisker such as calcium carbonate whisker, magnesium carbonate whisker, potassium titanate whisker, aluminum borate whisker, etc., inorganic fiber such as glass fiber, asbestos, metallic fiber, etc., or its web in cloth. The filler may be an organic compound such as carbon black, graphite powder, carbon fiber, aramid fiber, polyester fiber, etc.

Moreover, in order to prevent the deterioration of the polyolefin polymer due to heat, an aging preventive, such as N, N'-diphenyl-P-phenylene diamine, 2, 2'-methylenebis (4-ethyl-6-t-butylphenol), etc., may be added. Further, in order to prevent the deterioration due to light, an ultraviolet-rays sorbent, such as 2-hydroxy-4-n-octoxybenzophenon, 2-(2'-hydroxy-3'-third-butyl-5'-methylphenyl)-5-chlorobenzotriazole, etc., may be added.

The adding amount of all the additives (except the polyolefin plus oil) of 20 weight % or less of the entire weight of the material used for molding is preferable in order to maintain the supplying capability of the lubricant.

Figure 2:
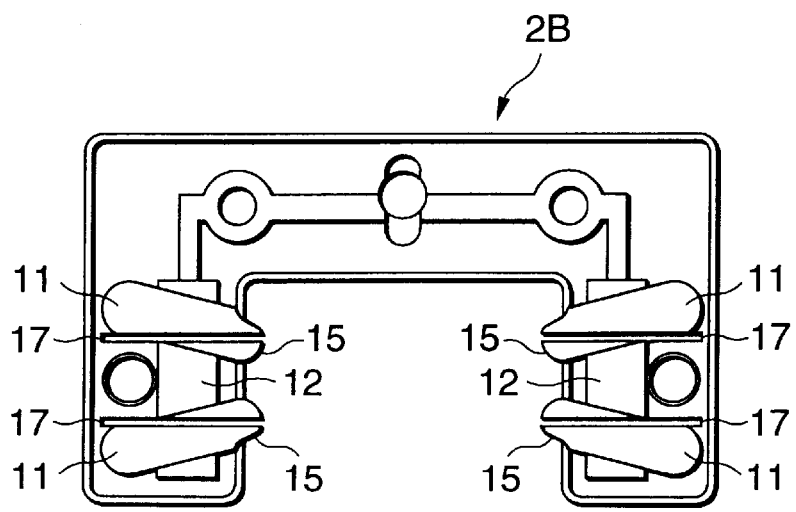
FIG. 2 is a back view of an end cap to be attached to the end of the slider in the linear guide apparatus.
Figure 4:
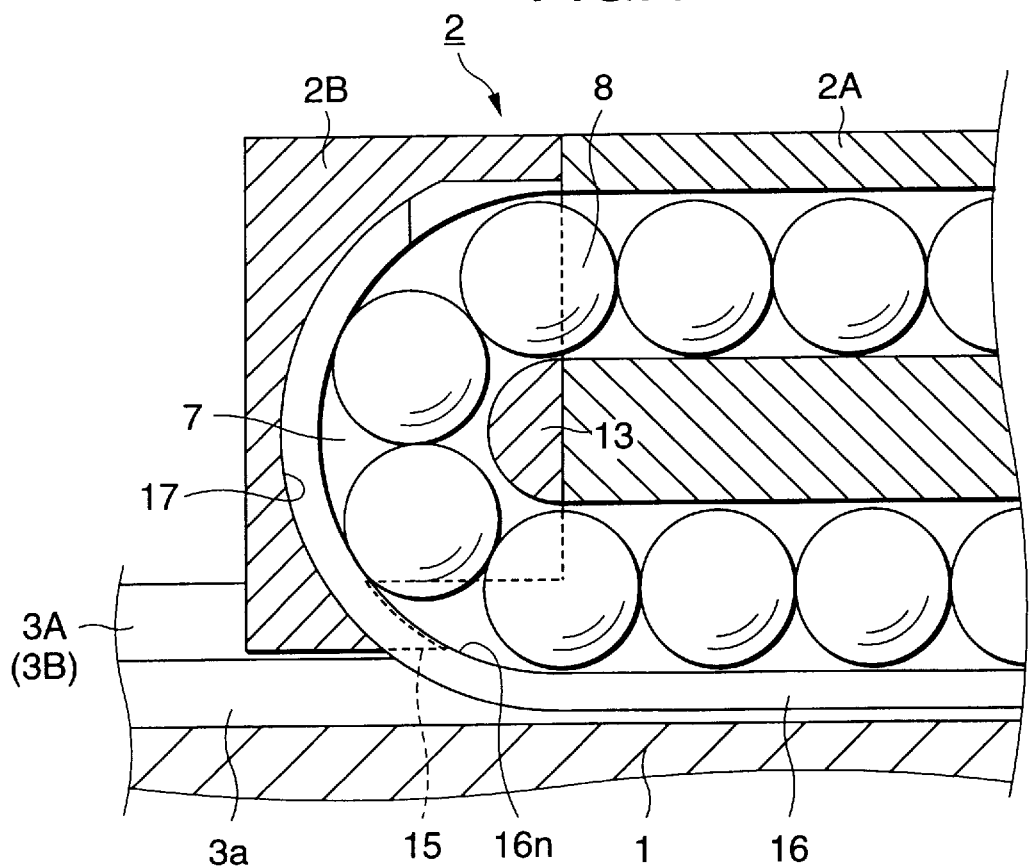
FIG. 4 is an enlarged view of area IV in FIG. 3.

The end cap 2B is formed to provide a U-like shape in section. On the surface (back surface) of the end cap 2B joining with the slider body 2A, as shown in FIG. 2, semicircular concave portions 11 are formed to cross the shoulders, respectively, at upper and lower stages. A semi-cylindrical concave groove 12 is formed to cross the center portion of the semicircular concave portion 11 in a longitudinal direction (vertically). A semi-cylindrical return guide 13 as shown in FIGS. 3 and 4 is fit in the semi-cylindrical concave groove 12. Fitting the returning guide 13 forms the curvature passage 7 in a semi-doughnut shape, and the outer surface of the returning guide 13 constitutes an guide surface of the inner peripheral side of the curvature passage 7.

In the end cap 2B, at the inner end of the curvature passage 7 which guides the U-turn of each of the rolling elements 8, a rolling-element scooping-up protrusion 15 which protrudes in a semi-circular shape is formed. The acute tip of the scooping-up protrusion 15 is proximate to the groove bottom of the rolling-element rolling grooves 3A, 3B of the guide rail 1. The rolling-element scooping-up protrusion 15 is provided with a groove 17 in which a wire type holder 16 is attached. The curved portion of the end of wire type holder 16 of steel is inserted in the groove 17 so that the holder 16 is mounted in the slider 2.

In this case, as shown in FIG. 4 in detail, the tip of the rolling-element scooping-up protrusion 15 protruding from the inside of the end cap 2B is slightly retired from the curvature inner face 16n of the wire type holder 16. Namely, in such a structure, the wire type holder 16 scoops up the rolling elements 8 making a U-turn on the curvature passage 7 and guides them. The reason therefor is as follows. The strength of the end cap 2B of the oil-containing material is not enough to scoop up by the rolling-element scooping-up protrusion 15 so that the rolling element 8 is guided to curvature passage 7. Therefore, the strength of the holder 16 which essentially intends to prevent the rolling element 8 from falling out is used to guide the rolling elements 8 in their U-turn. Incidentally, in a state where the slider 2 is combined with the guide rail 1, the most part of the holder 16 except its curvature portion at both ends is received in the holder relief groove 3a so that it does not interfere with the guide rail 1.

An explanation will be given of the operation of this embodiment.

When the slider 2 moves on the guide rail 1 secured to a stand, the rolling elements 8 within the slider 2, while they roll on the rolling-element rolling passage, move in a moving direction of the slider at a lower speed than the slider 2. The rolling elements 8 U-turn at the curvature passage 7 at the one end and move on the rolling-element returning passage in a reverse direction while they roll. The rolling elements 8 reverse-U turn on the curvature passage 7 at the other end to return into the rolling element rolling passage. Such a circulation is repeated.

The rolling elements 8 which move in a circulating manner, when they U-turn and reverse-U turn while they pass the curvature passages 7 formed at the end caps 2B of the oil-containing material, are brought into contact with the inner walls on the outer peripheral side of the curvature passages 7. Under the influence of the friction heat during such contact moving, the lubricant seeps gradually with a time passage from the oil containing material and is automatically supplied to the contact face of each rolling element. The lubricant is continuously supplied from the rolling elements 8 to the load rolling-element rolling groove 5 of the slider 2. Thus, stable lubrication can be effected for a long time. Accordingly, without supplying the lubricant from the exterior, the favorable operation of the linear guide apparatus can be continued with low torque for a long time.

In the structure according to this embodiment, the lubricant for the rolling elements can be continuously supplied from the end caps 2B of the oil containing material. Therefore, the grease nipple 9 may not be used, but the lubricant such as grease may be timely supplied into the slider 2 from the end caps 2B as necessary.

In the self-lubricating linear guide apparatus according to this embodiment, the end caps 2B, which are components of the slider 2, are molded products of the oil containing material. Therefore, the entire length of the slider 2 is not varied. For this reason, unlike the conventional self-lubricating linear guide apparatus further provided with the lubricant containing members at the ends of the slider, the stroke length is not shortened. Further, in order to compensate for the shortening of the stroke length, it is not necessary to lengthen the guide rail intentionally.

Figure 5:
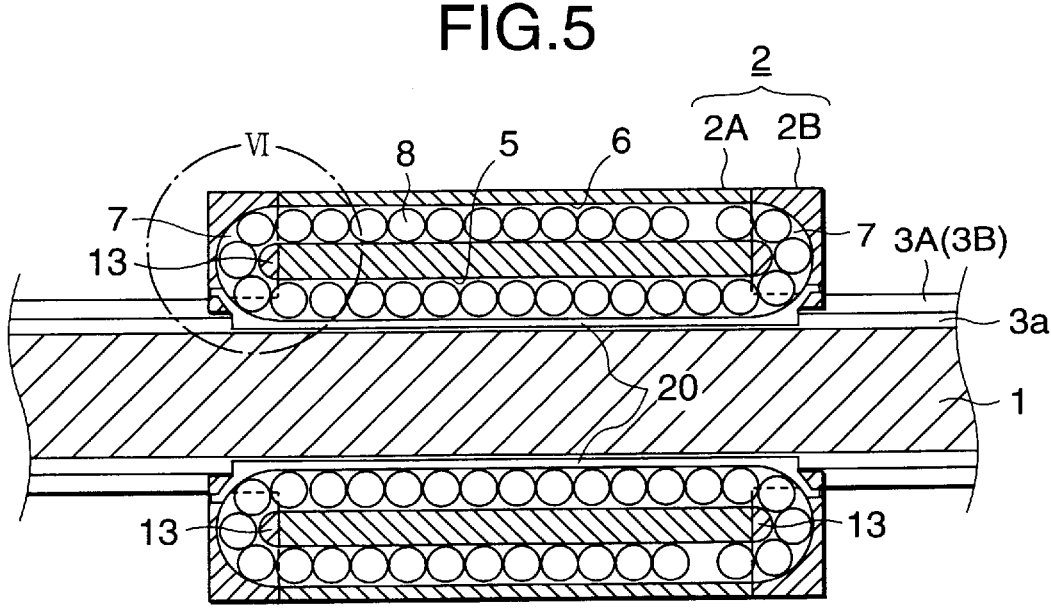
FIG. 5 is a sectional view for explaining the internal structure of a slider according to a second embodiment of the present invention.
Figure 6:
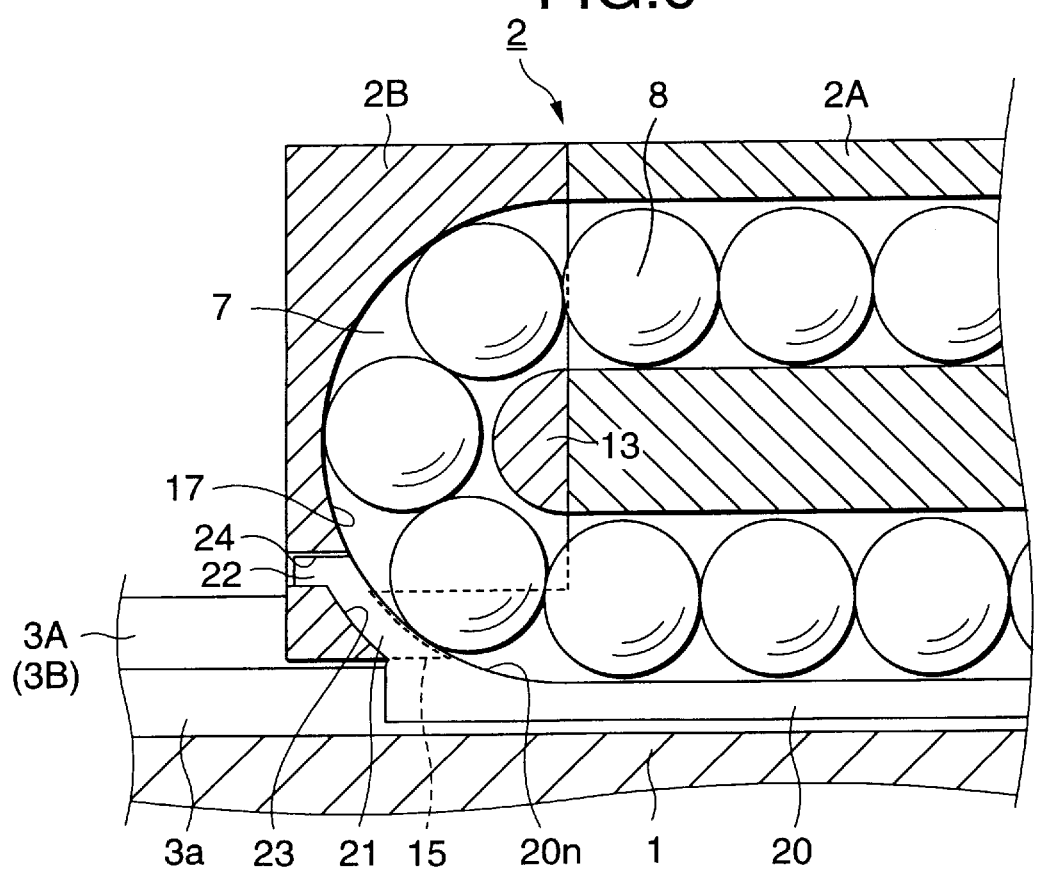
FIG. 6 is a sectional view of area VI in FIG. 5.

FIGS. 5 and 6 are views showing a second embodiment of the present invention. In this embodiment, in order to avoid repetitive explanation, like reference numerals refer to like members and like areas in the first embodiment. This embodiment, in the linear guide apparatus having a structure similar to that according to the first embodiment intends to modify the fashion of reinforcement of the scooping-up protrusion of the curvature passage at the end cap 2B of the oil-containing material, specifically the shape of the holder serving as a reinforcement member.

As seen from FIG. 5, particularly from FIG. 6, the holder according to this embodiment is formed in a shape of a sectional square plate which is stamped from a thin metal plate. At each of both end sides thereof in a longitudinal direction, a curvature 21 curved in an arc shape is formed in order to guide the rolling elements 8 smoothly. At the terminal thereof, an attachment protrusion 22 is formed. On the other hand, in the end cap 2B, on the inner wall of the rolling-element scooping-up protrusion 15 formed at the end on the inner side of the curvature passage 7, there are formed a holder attaching groove 23 in which the curvature 21 of the holder 20 is inserted and an insertion hole 24 into which the attachment protrusion 22 of the holder 20 is inserted. The holder 20 is mounted in such a manner that the attachment protrusion 22 is inserted in the insertion hole 24 and the curvature 21 is inserted in the holder attachment groove 23.

Thus, in case that the holder 20 according to this embodiment is attached to the end cap 2B, as shown in FIG. 6, the tip of the rolling-element scooping-up protrusion 15 protruding from the inner side of the end cap 2B is slightly retired from the inner diameter face 20n of the curvature of the holder 20. In this way, in the second embodiment also, like the first embodiment, the rolling elements 8 which U-turn on the curvature passage 7 are scooped up by not the rolling-element scooping-up protrusion 15 but by the holder 20. This compensates for shortage of the strength of the end cap 2B of the oil containing material. This embodiment can provide the same effect as in the first embodiment.

Figure 7:
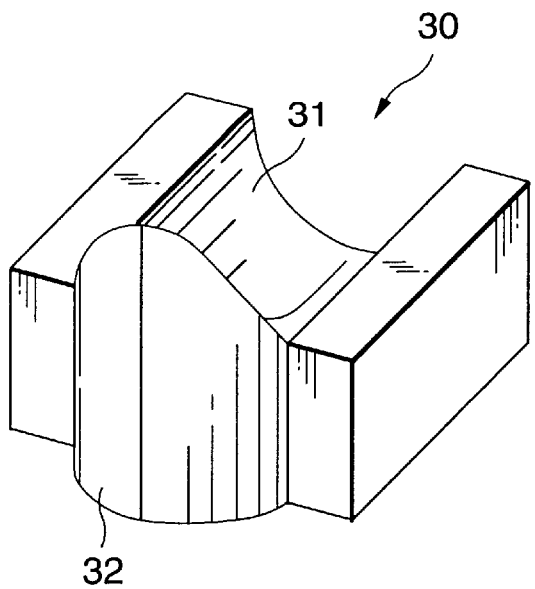
FIG. 7 is a perspective view of a rolling element scooping-up member according to a third embodiment of the present invention.
Figure 8:
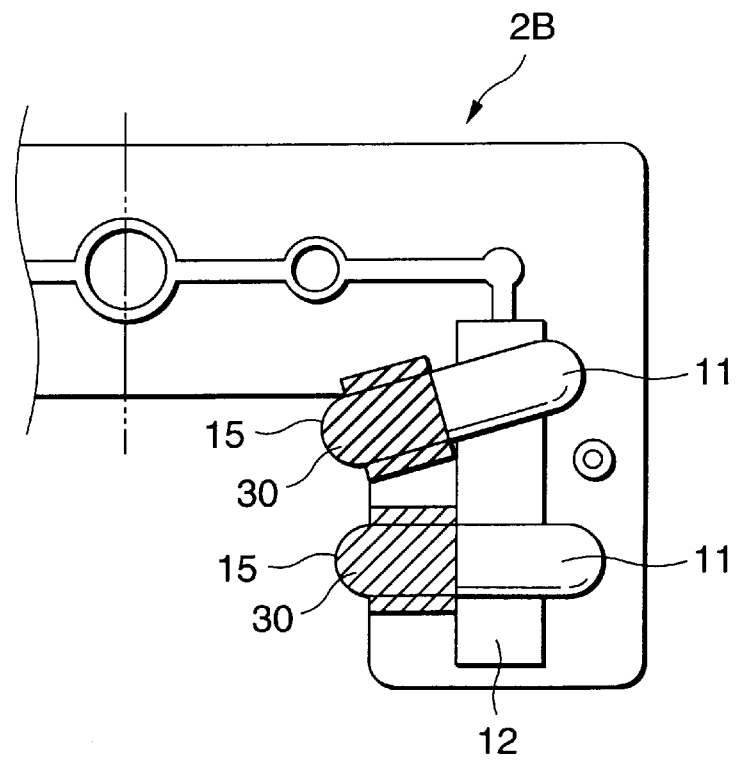
FIG. 8 is a partial back view of the end cap showing the manner of attaching the rolling element scooping-up member shown in FIG. 7.

FIGS. 7 and 8 show a third embodiment of the present invention. In order to avoid repetitive explanation, like reference numerals refer to like members and like positions. This embodiment is different from the first and second embodiments in that the rolling-element scooping-up protrusion 15 of the end cap 2B of the oil containing material is replaced by a rolling-element scooping-up member 30 so that the rolling elements U-turning at the curvature passage can be scooped up without recourse to the holder.

More specifically, the rolling-element scooping-up member 30 is formed as a separate body as shown in FIG. 7. The rolling element scooping-up member 30 is made of synthetic resin having sufficient strength, hard rubber or metal. The rolling-element scooping-up member 30 is provided with a curvature groove 31 constituting a part of the curvature passage 7 and a scooping-up protrusion 32 which protrudes from the end of the groove 31. The rolling-element scooping-up member 30 is embedded in the inner side of the curvature passage 7 of the end cap 2B as shown in FIG. 8 so that the rolling element scooping-up protrusion 15 is protruded. In such a configuration, in the end cap 2B of the oil containing material, the U-turning rolling elements 8 can be directly scooped up by using the rolling-element scooping-up protrusion 32 of the rolling-element scooping-up member 30 without recourse to the holder.

In each of the embodiments described above, the same structure for scooping up the rolling elements in the curvature passage 7 of the end cap 2B is given to all the curvature passages, e.g. provided at the upper and lower two stages. However, different rolling-element scooping-up structures may be adopted for the upper and lower stages. For example, a separate rolling-element scooping-up member 30 may be built into the curvature passage at the upper stage whereas the holder 16 or 20 may be used to scoop up the rolling elements on the curvature passage at the lower stage.

In each of the embodiments described above, the end cap 2B itself is made of an oil-containing material and the lubricant is supplied through contact of the curvature passage 7 with the rolling elements 8. However, at least a portion of the end cap 2B facing the guide rail 1 may be brought into contact with the guide rail 1 so that the lubricant can be supplied to the rolling element rolling groove 3A, 3B or the rolling elements 8.

Further, the linear guide apparatus to which the present invention is applied should not be limited to the models which were proposed by the embodiments described above. For example, the load rolling-element rolling groove may be designed in the other format than that of two rows on the one side. The rolling elements may be not balls but e.g. rollers.

In each of the embodiments described above, the end cap 2B itself is made of the oil-containing material. However, the entire end cap 2B is not required to be made of the oil containing material, but the contact portion of the end cap 2B with the rolling elements 8 or guide rail 1 may be made of the oil containing material.

As described above, according to the present invention, the lubricant that gradually seeps out from the end cap made of the oil containing material can be automatically supplied to the rolling elements which passes the curvature passage. Therefore, without supplying externally the lubricant, the smooth rolling of the rolling elements can be maintained for a long time. In addition, since the end cap part has a self-lubricating property, the entire length of the slider will not be lengthened. Thus, the stroke will not be shortened. Otherwise, it is not necessary to extend the entire length of the linear guide apparatus in order to assure the stroke.

While only certain embodiments of the invention have been specifically described herein, it will apparent that numerous modification may be made thereto without departing from the spirit and scope of the invention.

The present disclosure relates to the subject mater contained in Japanese patent application No. Hei. 10-118285 filed on Apr. 28, 1998 which is expressly incorporated herein by reference in its entirety.

What is claimed is:

1. A linear guide apparatus comprising:

a guide rail extending in an axial direction and having axial rolling-element rolling grooves formed in both side surfaces thereof;

a slider main body movably fitted about the guide rail, the slider main body having load rolling-element rolling grooves respectively opposing the axial rolling-element rolling grooves of the guide rail and having through bores acting as rolling-element return passage formed in parallel to the rolling-element rolling grooves of the slider main body;

end caps respectively joined to opposite ends of the slider main body, each of the end caps having curved passages for bringing the load rolling-element rolling grooves of the slider main body into communication with the rolling-element return passages to thereby construct a rolling-element circulating passage; and a plurality of rolling elements rollably filled in the rolling-element circulating passage, wherein at least a portion of the end caps in contact with at least one of the rolling elements and guide rail is made of an oil containing material.

2. A linear guide apparatus according to claim 1, wherein the oil containing material contains a lubricant having 20–80 weight % of the entire oil containing material.

3. A linear guide apparatus according to claim 1, further comprising:

a holder preventing the rolling elements from falling out and guiding the rolling elements to the curved passage, the holder having curvature-s at opposite ends thereof, wherein the end cap includes a rolling-element scooping-up portion including an attaching groove receiving the curvature of the holder.

4. A linear guide apparatus according to claim 3, wherein the rolling-element scooping-up portion protrudes in a semi-circular shape toward the axial rolling-element rolling grooves of the guide rail.

5. A linear guide apparatus according to claim 1, further comprising:

a rolling-element scooping-up member which guides the rolling members to the curved passage of the end cap and is separately formed with the end cap, and the rolling-element scooping-up member is made of a material having strength larger than the end cap.

6. A linear guide apparatus according to claim 1, further comprising:

a holder which guides the rolling elements to the curved passage of the end cap and is separately formed with the end cap, and the holder is made of a material having strength larger than the end cap.

* * * * *